Figure 1:
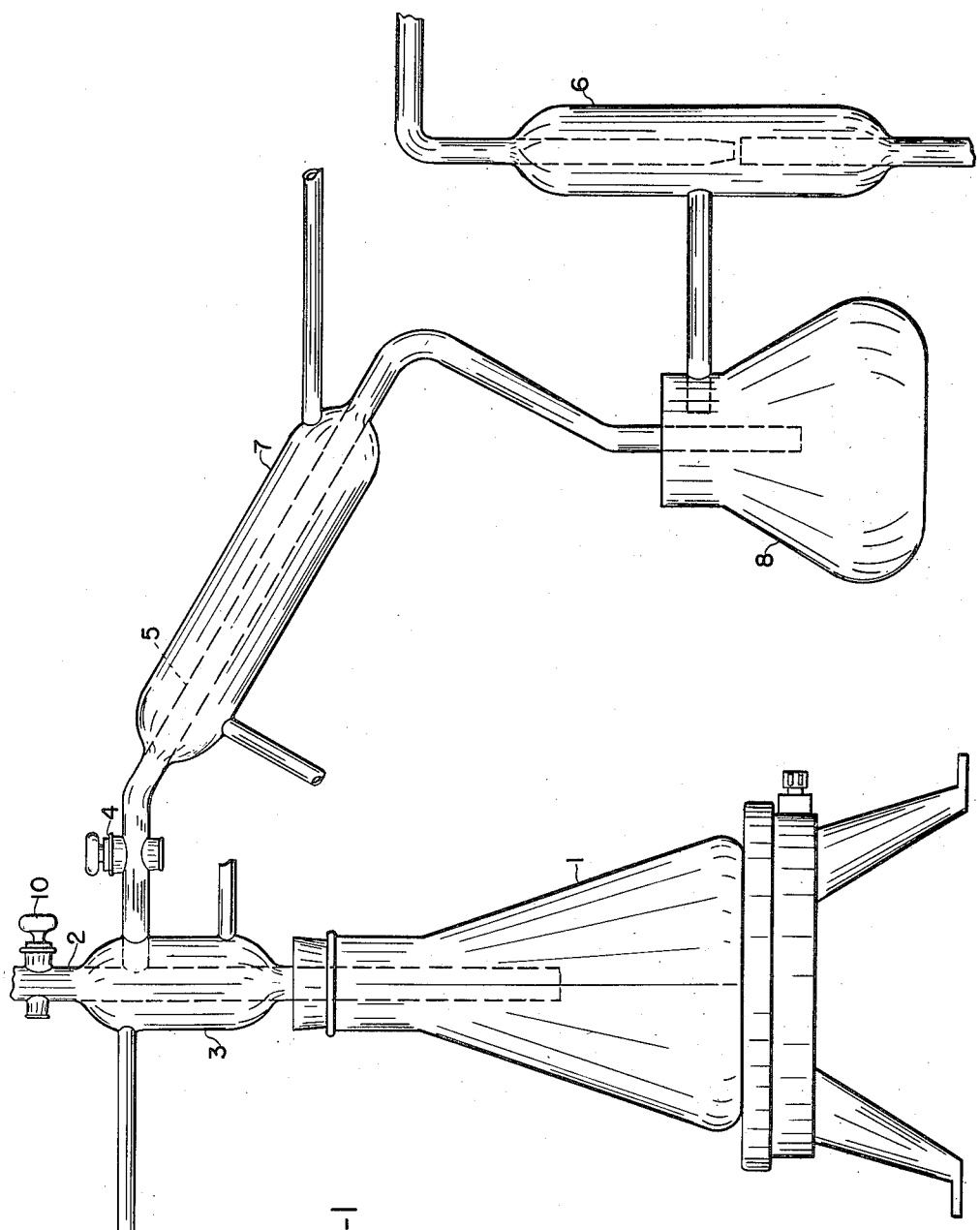
Figure 2:
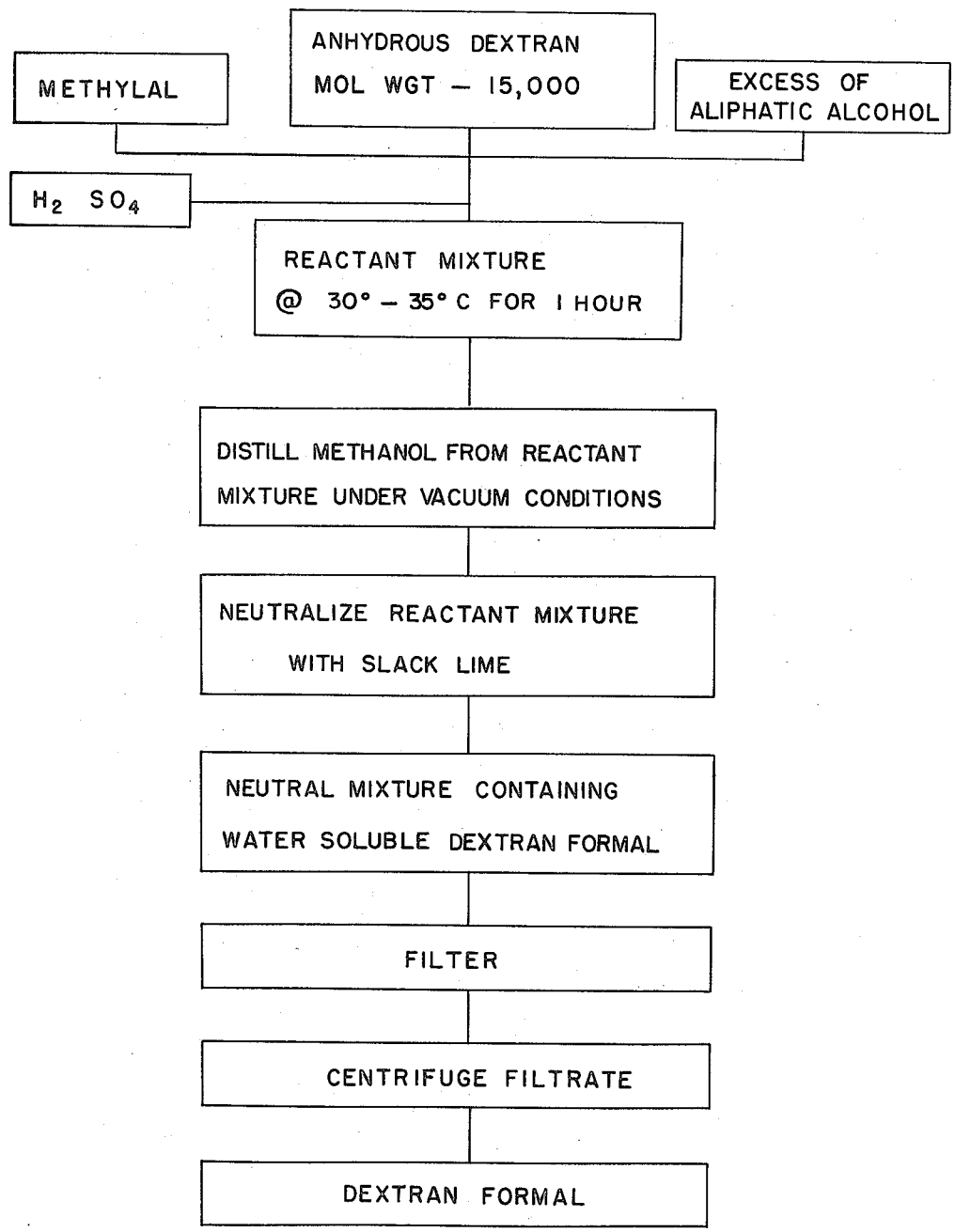

July 7, 1959 E. H. FOOTE, JR 2,893,987
DEXTRAN FORMALS

Filed Feb. 16, 1956 2 Sheets-Sheet 1

INVENTOR
EARL H. FOOTE JR.
BY Toulmin & Toulmin
ATTORNEYS 2,893,987
Patented July 7, 1959

2,893,987
DEXTRAN FORMALS

Earl H. Foote, Jr., Atwater, Ohio, assignor to The Commonwealth Engineering Company of Ohio, Dayton, Ohio, a corporation of Ohio Application February 16, 1956, Serial No. 565,990

1 Claim. (Cl. 260—209)

This invention relates to dextran formals, that is to condensates of dextran and formaldehyde, and to a method of making the same.

Dextran is a high molecular weight long chain polymer. It is a bacterial product made up of repeating anhydroglucose units which are linked, at least predominantly by 1,6 linkages and does not contain a free $CH_2OH$ group in the repeating structure, which group is characteristic of other polysaccharides such as cellulose and starch; it is amorphous, it may be soluble in cold water even in the native state having a molecular weight estimated in the millions; it does not give the iodine test; it is not susceptible to amylase type enzymes and is resistant to typical amolytic bacterial enzymatic degradation; it is not digestible to any marked extent in the gastro-intestinal system; the water-soluble native dextran is a partial haptene (antigen); and it does not require the mediation of phosphorylated sugar in the biosynthesis thereof as a result of the action of bacteria of the *L. mesenteroides* and *L. dextranicum* types on sucrose.

The present invention contemplates the production of the new products, dextran formals from water-soluble dextrans which may be in the native state, i.e., have a molecular weight estimated to be in the millions, or a water-soluble hydrolyzate of a native dextran having a molecular weight as low as 1000.

In the present method, dextran is combined with methylal to form a new reaction product. Combination of the dextran and methylal is accomplished by treating the water-soluble dextran with methylal in the presence of an aliphatic alcohol and a small amount of a strong acid, thereby forming a dextran polyformal by a process of acetal interchange and which evidently proceeds according to the following scheme:

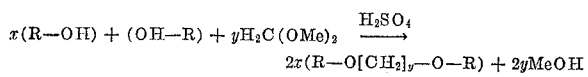

$$x(R\text{—}OH) + (OH\text{—}R) + yH_2C(OMe)_2 \xrightarrow{H_2SO_4} 2x(R\text{—}O[CH_2]_y\text{—}O\text{—}R) + 2yMeOH$$

The strong acid, such as sulfuric acid, is used to prevent breakdown of the methylal to formaldehyde and methanol, thus permitting the dextran to react with the methylal.

One mole of methylal per two moles of dextran is required for the chemical reaction, two moles of methanol being formed as by-product. An excess of the methylal may be and usually is used.

The presence of the methanol during the reaction tends to impede it. In the prior art method of making formals of such base materials as polyvinyl alcohol, dextrin, starch and cellulose, it has been proposed to include formaldehyde in the reaction mass for the purpose of converting the by-product alcohol to the acetal. This removes alcohol as such from the reaction site. However, the reaction between the added formaldehyde and alcohol yields water as a by-product and this water also tends to impede the reaction resulting in the formal. Water-absorbing substances have to be included or the water must be evaporated.

In the present method for making the new dextran formals, however, water is not formed, nor is formaldehyde as such mixed with the reactants. Instead, the acidified suspension of the dextran, methylal, and methanol are heated together at a controlled temperature of 30 to 35° C. under refluxing conditions and after the reaction has been initiated and has proceeded to a predetermined stage, methanol and unreacted methylal are slowly distilled off and condensed, the reaction being completed under conditions of removal of the methanol-methylal mixture, the rate of which removal serves in conjunction with the time of reaction prior to initiation of the distillation, as a control for the extent of the reaction and the solubility characteristics of the final product.

While the starting dextran is water-soluble, the solubility of the dextran formals depends on the extent of the reaction of the methylal with the dextran and may be predetermined, water-soluble or water-insoluble dextran formals being produced optionally and at will.

To obtain a water-soluble dextran, the reaction is allowed to proceed under reflux at 30° C. to 35° C. and under atmospheric pressure for a time, generally for 30 to 60 minutes, and then the methanol plus unreacted methylal are distilled off slowly and condensed for re-use in a subsequent run. The rate at which the methanol-methylal mixture is removed from the reaction zone is such that about one hour is required to remove 100 gms. of the methanol.

This slow distillation permits the reaction to proceed but with progressively less methylal available for the reaction so that the resulting dextran formal remains in the water-soluble stage.

On the other hand, if a water-insoluble dextran formal is desired, that is one in which a higher percentage of the methylal is reacted with the dextran, then the acidified mass may be heated under reflux at 30 to 35° C. for 2 to 3 hours after which removal of the methanol-unreacted methylal mixture may be effected at a rate such that 30 minutes are required to remove 100 gms. of the methanol.

Careful control of the temperature should be exercised during the reaction so that it is maintained at 30° to 35° C. and not allowed to rise above 40° C. as the extreme upper limit since if the temperature rises unduly the methylal, which has a boiling point of about 42° C., may tend to be distilled off. Accordingly, means, such as a good flow of low temperature cooling water in a jacket associated with the reaction vessel, should be maintained to prevent escape of methylal from the reactants mixture.

If cooling water is used, the methanol will be condensed sufficiently, even at atmospheric pressure, to accomplish good refluxing.

As noted, the product produced may be a water-soluble dextran formal which is separable from the reaction mass by, for instance, centrifugation, or it may be a water-insoluble product having resinous characteristics.

In the accompanying drawing, the single figure is a schematic representation of apparatus suitable for carrying out the method.

As shown, the apparatus comprises a vessel 1 provided with an extension 2 surrounded by a cooling water jacket 3. Means (not shown) are provided for supplying heat to the vessel. Extension 2 is provided with a valve 10 and connected with a line 5 having a petcock 4 therein and a portion of which is surrounded by a cooling chamber 7. Line 5 delivers to the receiver 8 connected with the aspirator 6.

In practice, the dextran, in the form of anhydrous powder, the methylal, methanol and acid are placed in the vessel 1, the manually operated valve 10 being allowed to remain open. The contents of vessel 1 are heated to 30 to 35° C. After the reaction has proceeded for the desired length of time under atmospheric pressure, extension 2 is closed off at 10 and petcock 4 in line 5 is opened so that the pressure in the unit is lowered by the action of the aspirator 6 to about 50 mm. The methanol plus unreacted methylal mixture is distilled off at a predetermined rate under the vacuum conditions and is condensed in the portion of line 5 surrounded by the cooling chamber 7, from which the condensate flows into receiver 8 and is stored for re-use. The distillation apparatus is then disconnected from vessel 1 and the mass present in the vessel is neutralized (pH 6.5–7.0).

Anhydrous conditions are maintained throughout the reaction, and anhydrous reagents are used. However, when the reaction is complete, the addition of an aqueous neutralizing agent, such as slack lime, does not harmfully affect the dextran formal, whether it is water-soluble or water-insoluble.

The neutral mass comprises, in addition to the dextran formal and when slack lime is the neutralizing agent, a small amount of calcium sulfate, a small amount of calcium hydroxide, some unreacted methylal, some unreacted dextran, and some methanol.

When the dextran formal is water-soluble it may be recovered by filtering off the calcium sulfate and calcium hydroxide and thereafter centrifuging the filtrate. The water-soluble dextran formal is obtained as a viscous oily liquid which is suitable for use in compounding perfumes, in water emulsions of various substances, and so on.

When the dextran formal is water-insoluble it may be recovered from the reaction mass by neutralizing the same with calcium hydroxide and filtering the cold mixture to remove insolubles. The insoluble dextran formal is retained on the filter in admixture with some calcium sulfate, calcium hydroxide and unreacted dextran. Such mixture is then treated with a large excess of water whereby the calcium hydroxide and water-soluble unreacted dextran are dissolved and may be removed by filtering. The residual solid material on the filter may then be treated with an organic solvent for the dextran formal, such as xylol, toluol, acetone, and so on, but which does not dissolve the calcium sulfate which can be separated by filtration. The filtrate, which is an organic solvent solution of the water-insoluble dextran formal may be used as such (as, for instance, an adhesive) or it may be dried to obtain the water-insoluble dextran formal which may be redissolved in a suitable organic solvent at a subsequent time.

Instead of using methanol, other water-miscible lower aliphatic alcohols such as ethyl alcohol and isopropyl alcohol may be used.

The rate at which the methanol-unreacted methylal mix is distilled off can be readily controlled by controlling the pressure at which the distillation is carried out at the temperature of 30–35° C. The pressure in the unit may be lowered to 20 to 50 mm. after the reaction has proceeded at atmospheric pressure for the predetermined time between 1 and 3 hours.

The following examples are given to illustrate specific embodiments of the invention, it being understood that these examples are not intended as limitative. In these examples, the dextran used is identified in terms of the strain of Leuconostoc used for synthesizing the same from sucrose. The designation NRRL preceding the classification number means that the strains are classified by the Northern Regional Research Laboratories system.

*Example I.*

Using apparatus as shown in the drawing, about 1500 gms. of substantially anhydrous powdered dextran (a hydrolyzate of NRRL *L.m.* B-512 native dextran) are placed in a vessel 1, and 500 gms. of 100% methanol and 300 gms. of methylal are added. To the resulting suspension there are added about 12 gms. of concentrated sulfuric acid.

The acidified suspension is maintained at 30–35° C. under atmospheric pressure for about 1 hour, after which the pressure is reduced to 50 mm. and the methanol and unreacted methylal are distilled off and condensed. About 2 parts of the mixture are taken off over each 15 minute period until 100 gms. of methanol have been removed.

The reaction mass is then neutralized with slack lime and filtered. The filtrate is centrifuged. The water-soluble dextran formal is obtained as a viscous oil.

*Example II*

Example I is repeated except that 500 gms. of native, unhydrolyzed, water-soluble *L.m.* B-512 dextran, 1000 gms. of methanol and 600 gms. of methylal are used.

*Example III*

Example I is repeated except that 1000 gms. of hydrolyzed (M.W. 500,000 average) water-soluble *L.m.* B-1146 dextran, 800 gms. of methanol and 500 gms. of methylal are used.

*Example IV*

Example I is repeated. However, the mass is maintained at 30–35° C. in vessel 1 for about 3 hours, and thereafter the pressure is reduced to about 20 to 25 mm. and the methanol-unreacted methylal is distilled off at a rate such that 30 minutes are required to take off 100 gms. of methanol. In all, 400 gms. of methanol are removed.

The reaction is neutralized with aqueous calcium hydroxide (to pH 6.5–7.0), and filtered. The solid mass remaining on the filter is mixed with toluol and again filtered. The filtrate is a toluol solution of the water-insoluble dextran formal.

In other runs, using water-soluble dextran of other molecular weights between 1000 and that of native, unhydrolyzed dextran, and methylal at least in an amount to provide a mole of the methylal for each two moles of the dextran, results similar to those of the examples were obtained. The amount of methanol used is always sufficient to obtain a fluid suspension of the dextran and methylal. The term "native" dextran is used herein in its usual sense to mean the unhydrolyzed raw dextran as produced microbiologically from dextran and precipitated from the fermentate.

Except for the temperature, which is always maintained at 30–35° C. regardless of the molecular weight of the dextran, some changes and modifications may be made. For instance, other strong acids, including hydrochloric acid, may be used to adjust the pH of the mass to 1.5 and 3.0, other neutralizing agents, and other solvents for the water-insoluble dextran formal may be used. Since such changes may be made in practicing the invention without departing from the spirit and scope thereof it is not intended to limit the invention except as defined in the appended claim. This application is a continuation-in-part of my prior application Ser. No. 207,409, filed February 7, 1952, now abandoned.

What is claimed is:

A method of making a water-insoluble dextran formal which comprises admixing methanol, water-soluble dextran having a molecular weight between 1000 and that of native dextran and methylal in the ratio of at least one mole of methylal to two moles of dextran, acidifying the resultant suspension with the addition of sulfuric acid, heating the acidified suspension to 30° C. to 35° C., maintaining the suspension at said temperature for 2 to 3 hours at atmospheric pressure, thereafter reducing the pressure to 20 to 25 mm. and distilling off the methanol and methylal at a rate such that 100 gms. of methanol are removed per half hour, the distillation being continued until at least 100 gms. of methanol are removed while the mass is maintained at the temperature in the range of 30° C. to 35° C., introducing calcium hydroxide into the resultant reaction mixture to neutralize the same, filtering the reaction mass, mixing the mass on the filter with toluol and filtering to recover a toluol solution of water-insoluble dextran formal.

References Cited in the file of this patent

UNITED STATES PATENTS

| | | |
|---|---|---|
| 2,222,872 | Leuck | Nov. 26, 1940 |
| 2,360,477 | Dahle | Oct. 17, 1944 |
| 2,602,082 | Owen | July 1, 1952 |
| 2,671,779 | Gaver | Mar. 9, 1954 |